United States Patent
Zondervan et al.

(10) Patent No.: US 9,919,792 B2
(45) Date of Patent: Mar. 20, 2018

(54) VEHICLE ATTITUDE CONTROL USING JET PADDLES AND/OR MOVABLE MASS

(71) Applicant: THE AEROSPACE CORPORATION, El Segundo, CA (US)

(72) Inventors: Kevin L Zondervan, Alexandria, VA (US); Jerome K Fuller, Van Nuys, CA (US)

(73) Assignee: The Aerospace Corporation, El Segundo, CA (US)

( * ) Notice: Subject to any disclaimer, the term of this patent is extended or adjusted under 35 U.S.C. 154(b) by 267 days.

(21) Appl. No.: 14/322,752

(22) Filed: Jul. 2, 2014

(65) Prior Publication Data

US 2016/0194089 A1    Jul. 7, 2016

(51) Int. Cl.

| | |
|---|---|
| B64C 15/02 | (2006.01) |
| B64C 17/00 | (2006.01) |
| F02K 1/00 | (2006.01) |
| F02K 9/90 | (2006.01) |
| B64C 19/00 | (2006.01) |
| F02K 9/80 | (2006.01) |

(52) U.S. Cl.
CPC .............. *B64C 15/02* (2013.01); *B64C 17/00* (2013.01); *B64C 19/00* (2013.01); *F02K 1/002* (2013.01); *F02K 9/80* (2013.01); *F02K 9/90* (2013.01)

(58) Field of Classification Search
CPC . B64C 29/0033; B64C 29/0025; B64C 29/00; B64C 29/0066; B64C 27/52; B64C 29/0075

USPC ............................ 244/12.5, 12.4, 23 A, 23 C
See application file for complete search history.

(56) References Cited

U.S. PATENT DOCUMENTS

| | | | | | |
|---|---|---|---|---|---|
| 3,258,223 | A | * | 6/1966 | Skov | B64G 1/288 244/166 |
| 3,318,532 | A | * | 5/1967 | Gaubatz | F02K 9/82 239/265.23 |
| 3,606,210 | A | * | 9/1971 | Busby | B64C 29/0075 244/12.4 |
| 3,730,460 | A | * | 5/1973 | Mederer | B64C 15/02 244/12.5 |
| 3,785,595 | A | * | 1/1974 | Fischell | B64G 1/22 244/166 |
| 4,203,569 | A | * | 5/1980 | Marks | F02K 9/978 244/3.23 |

(Continued)

OTHER PUBLICATIONS

ZonderVan et al. "CubeSat Solid Rocket Motor Propulsion System Providing Delta Vs Greater than 500 m-s.pdf", 28th Annual AIAA/USU Conference on Small Satellites.*

(Continued)

*Primary Examiner* — Assres H Woldemaryam
(74) *Attorney, Agent, or Firm* — LeonardPatel PC

(57) ABSTRACT

Attitude and/or attitude rate of a vehicle may be controlled using jet paddles and/or movable masses. Thrust direction generally may also be controlled using jet paddles. The jet paddles may be moved into and/or sufficiently close to the exhaust flow, and out of the exhaust flow, to change the thrust direction. Movable masses may also be used in addition to, or in lieu of, jet paddles. Movement of the movable masses alters a center-of-mass of the vehicle, generating torque that changes vehicle attitude.

22 Claims, 14 Drawing Sheets

(56) References Cited

U.S. PATENT DOCUMENTS

| | | | | |
|---|---|---|---|---|
| 4,274,610 | A | * | 6/1981 | Bastian ............... F42B 10/665 239/265.19 |
| 4,408,740 | A | * | 10/1983 | Kleber ................. B64G 1/22 117/901 |
| 4,898,343 | A | * | 2/1990 | Kamo ................ B64C 29/0075 244/12.4 |
| 5,154,050 | A | * | 10/1992 | Herup ................... F02K 9/90 239/265.19 |
| 6,082,670 | A | * | 7/2000 | Chapman ................ B63B 1/32 244/55 |
| 6,318,668 | B1 | * | 11/2001 | Ulanoski ............ B64C 29/0058 239/265.19 |
| 2006/0006759 | A1 | | 1/2006 | Matsuki |
| 2008/0127775 | A1 | * | 6/2008 | Stoner ................... F03G 3/00 74/84 R |
| 2008/0302183 | A1 | * | 12/2008 | Peng ................... G02B 26/001 73/504.12 |
| 2011/0184591 | A1 | * | 7/2011 | Kordt ................. G05D 1/0825 701/3 |
| 2012/0298789 | A1 | * | 11/2012 | Oz ...................... B64C 29/0033 244/12.4 |
| 2014/0166815 | A1 | * | 6/2014 | Dula ..................... B64G 1/24 244/164 |

OTHER PUBLICATIONS

Ahn T. Young, "Attitude Dynamics and Control of a Spacecraft Using Shifting Mass Distribution", 2012.*

"X-31 Enhanced Fighter Maneuverability Demonstrator", NASA, 2008.*

Jacob Bean, "Small Satellite Attitude Control Using Linear Moving Mass Actuators", 2008.*

Schaefermeyer, "Aerodynamic Thrust Vectoring for Attitude Control of a Vertically Thrusting Jet Engine".*

"Tactical Missile Design," E.L. Fleeman, pp. 36-53, AIAA Education Series, First Edition (2001).

"Tactical Missile Design," E.L. Fleeman, pp. 66-67, AIAA Education Series, Second Edition (2006).

"Evolved SeaSparrow Missile Jet Vane Control System Prototype Hardware Development," Andrew B. Facciano, Karleen G. Seybold, Teri L. Westberry-Kutz, and Dale O. Widmer, Journal of Spacecraft and Rockets, vol. 39, No. 4, Jul.-Aug. 2002.

"Finite-Horizon Robust Integrated Guidance-Control of a Moving-Mass Actuated Kinetic Warhead," P. K. Menon, S. S. Vaddi, and Ernest J. Ohlmeyer, presented at the 2006 AIAA Guidance, Navigation, and Control Conference, Aug. 21-24, Keystone, CO.

"Integrated Guidance and Control of Moving-Mass Actuated Kinetic Warheads," P. K. Menon, G. D. Sweriduk, E. J. Ohlmeyer, and D. S. Malyevac, Journal of Guidance, Control, and Dynamics, vol. 27, No. 1, pp. 118-126, Jan.- Feb. 2004.

"Jet Vane Control System Prototype Hardware Development for the Evolved SeaSparrow Missile," Andrew B. Facciano, Karleen G. Seybold, Teri L. Westberry-Kutz, andDale O. Widmer, Raytheon Missile Systems Technical Report (1999).

"Moving Mass Actuated Reentry Vehicle Control Based on Trajectory Linearization," Xiao-Long Su, Jian-Qiao Yu, Ya-Fei Wang, and Lin-Iin Wang, Int'l J. of Aeronautical & Space Sci. 14(3), 247-255 (2013).

"Numerical SDRE Approach for Missile Integrated Guidance—Control," S. S. Vaddi, P. K. Menon, and E. J. Ohlmeyer, http://www.optisyn.com/research/publications/2009/SDRE_paper_igcd.pdf (2009).

Christopher P. Rahaim et al., "Jet Vane Thrust Vector Control—A Design Effort," American Institute of Aeronautics and Astronautics (AIAA) Paper 96-2904 (Jul. 1996).

Thomas L. Moore, "Solid Rockets," Aerospace America, Propulsion and Energy, pp. 50-51 (Dec. 2003).

* cited by examiner

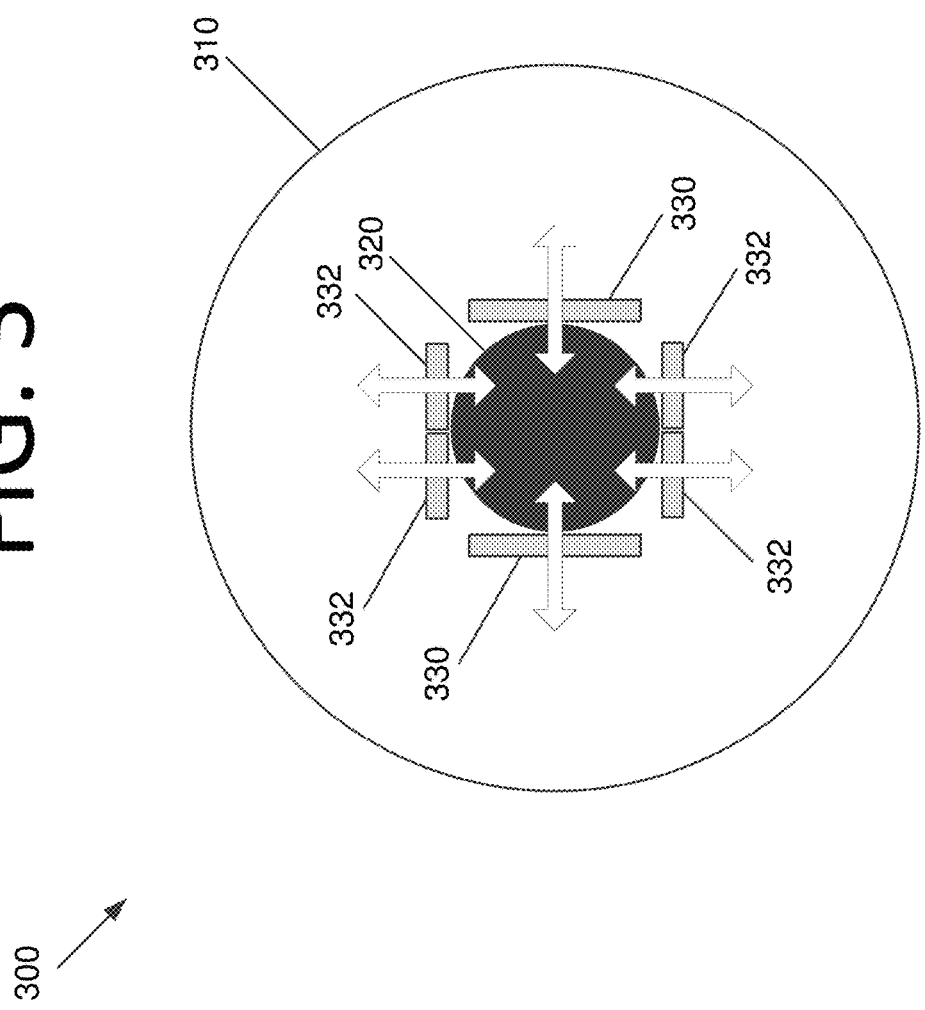

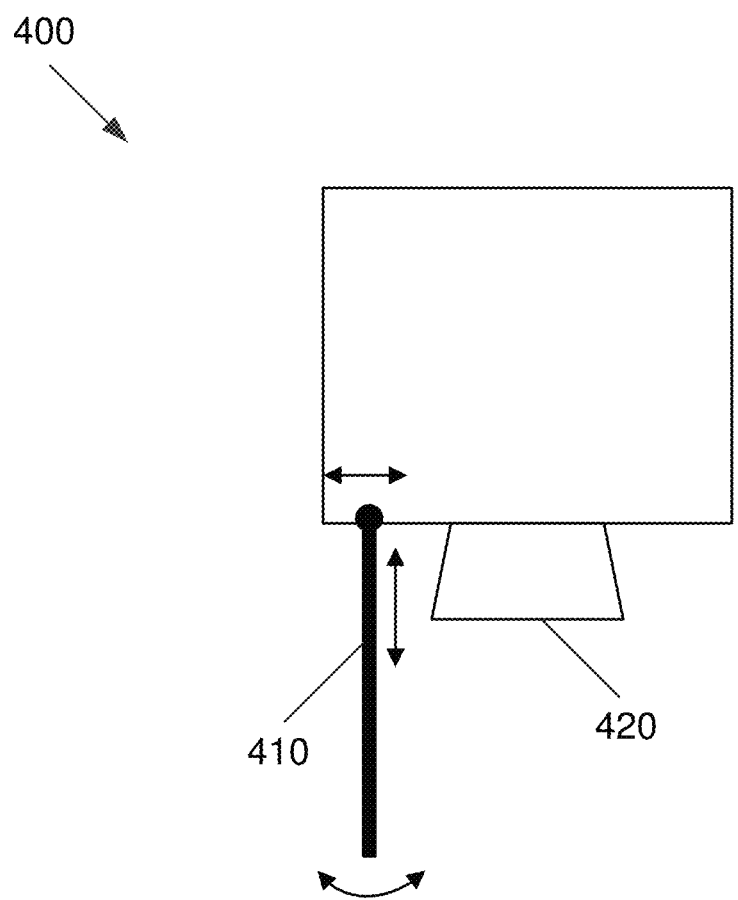

VEHICLE ATTITUDE CONTROL USING JET PADDLES AND/OR MOVABLE MASS

FIELD

The present invention generally pertains to vehicle flight control, and more specifically, to vehicle attitude control using jet paddles and/or movable mass.

BACKGROUND

Conventional approaches to steering a rocket-propelled vehicle employ an attitude control system (ACS) for directing the thrust of the rocket engine. Thrust vector control (TVC) approaches generate torque needed for attitude control and may be employed in both endoatmospheric and exoatmospheric vehicles in some cases. When steering a rocket-propelled vehicle, there is an intimate connection between the thrust of the main rocket motor and the needed torque to maintain attitude control. High performance rocket motors typically have thrust misalignment errors of between 0.15° and 0.25°. TVC systems can compensate for thrust misalignment by redirecting the thrust by an appropriate angle relative to the vehicle. The needed torque is approximately the thrust times the distance between the nozzle of the rocket motor and the center-of-mass of the vehicle times the misalignment error expressed in radians.

Conventionally, TVC for rocket-propelled vehicles is performed using jet vanes, a gimbaled nozzle, a gimbaled engine, multiple engines with variable thrust, or a vectoring exhaust nozzle. Also, low thrust spacecraft may make use of other torque generation techniques, such as reaction wheels, control moment gyros, and magnetic torque coils.

Movable mass has also been considered for generating torque and controlling the attitude of a vehicle when external forces (e.g., thrust and aerodynamic forces) are applied to the vehicle. As used herein, movable mass denotes one or more volumes of mass that can be moved to alter the location of the center-of-mass of a vehicle. "Movable mass" and "movable masses" are used interchangeably. Movable masses have been analyzed and computer simulated for kinetic kill vehicles. However, such movable masses have always been internal to these vehicles, and furthermore, they have not been applied specifically to mitigating thrust misalignments. Also, TVC systems and movable mass systems have not been applied to small rocket-propelled vehicles, e.g., rocket motors with a mass of a few kilograms and nozzle dimensions of a few centimeters. Accordingly, an alternative ACS that may be configured for such vehicles may be beneficial.

SUMMARY

Certain embodiments of the present invention may be implemented and provide solutions to the problems and needs in the art that have not yet been fully solved by conventional vehicle ACSs and/or steering systems. For example, some embodiments of the present invention use two or more movable jet paddles and/or movable masses to control the attitude (i.e., pitch, yaw, and/or roll) of a thrusting vehicle. Certain embodiments of the present invention use movable mass to control the pitch/yaw, pitch/yaw rate, or both, of a vehicle subjected only to a thrust force.

In one embodiment of the present invention, an apparatus includes a plurality of jet paddles configured to be moved into and/or sufficiently close to an exhaust flow, and configured to be moved away from the exhaust flow, to change a direction of thrust produced by the exhaust flow. The plurality of jet paddles may be positioned relative to the exhaust flow to avoid a stagnation point. The plurality of jet paddles each pivot about an edge most proximate to where the exhaust flow exits the apparatus, each translate towards and away from the exhaust flow, or move by a combination of rotation and translation towards and away from the exhaust flow.

In another embodiment of the present invention, a computer-implemented method includes monitoring, by a computing system, whether to execute thrust direction changes for a vehicle producing thrust with an exhaust flow due to a planned change in thrust direction, and/or due to unknown and/or unplanned force perturbations. Unknown or unplanned force perturbations may include a thrust misalignment error, drag and/or lift perturbations, and/or any other unknown or unplanned force. The computer-implemented method also includes altering the thrust direction of the vehicle, by the computing system, when a thrust direction change is desired by moving at least one jet paddle into and/or sufficiently close to an exhaust flow, and/or moving at least one jet paddle away from the exhaust flow.

In another embodiment, an apparatus includes one or more movable masses configured to change a center of mass of the apparatus. At least one of the movable masses is exterior to the apparatus, or movable from an interior to an exterior of the apparatus and vice versa.

In yet another embodiment of the present invention, an apparatus includes one or more movable masses configured to move a center-of-mass of the apparatus. The apparatus also includes a computing system configured to calculate torque for attitude and/or attitude rate control of the apparatus. The computing system is also configured to calculate a nulling torque to compensate for thrust misalignment. The computing system is further configured to modify the center-of-mass of the apparatus by moving at least one of the one or more movable masses to achieve the torque and/or the nulling torque.

In still another embodiment of the present invention, a computer-implemented method includes calculating, by a computing system, a torque to compensate for thrust misalignment, perform attitude control, and/or perform attitude rate control. The computer-implemented method also includes performing nullification of a thrust misalignment, performing attitude control, and/or performing attitude rate control, by the computing system, by moving at least one movable mass to alter a center-of-mass of the apparatus.

In another embodiment of the present invention, an apparatus includes a plurality of jet paddles configured to be moved into and/or sufficiently close to an exhaust flow, and configured to be moved away from the exhaust flow, to change a direction of thrust produced by the exhaust flow. The plurality of jet paddles each pivot about an edge most proximate to where the exhaust flow exits the apparatus, each translate towards and away from the exhaust flow, or move by a combination of rotation and translation towards and away from the exhaust flow. The apparatus also includes one or more movable masses configured to move a center-of-mass of the apparatus.

In yet another embodiment of the present invention, a computer-implemented method includes monitoring, by a computing system, whether to change attitude and/or attitude rate due to a planned attitude and/or attitude rate correction, and/or due to unknown and/or unplanned force perturbations. The computer-implemented method also includes altering the attitude and/or attitude rate of the vehicle, by the computing system, when a change is desired by moving at least one jet paddle, by moving at least one movable mass, or both.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 illustrates a six jet paddle TVC system capable of controlling pitch, yaw, and roll, according to an embodiment of the present invention.

FIG. 4 illustrates a rocket-propelled vehicle with a jet paddle configured to move by rotation, translation, or a combination of rotation and translation, according to an embodiment of the present invention.

DETAILED DESCRIPTION OF THE EMBODIMENTS

Figure 1:
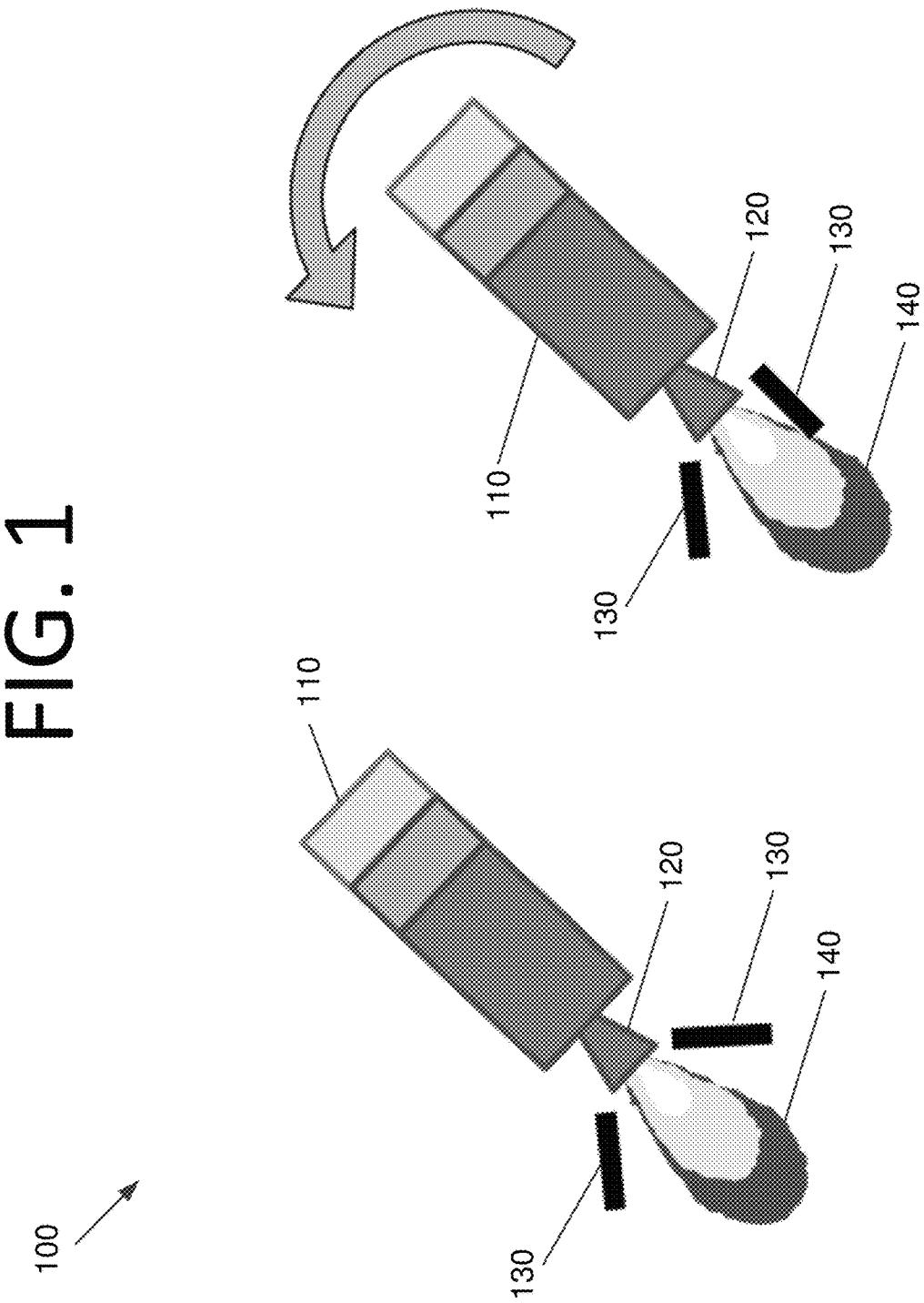
FIG. 1 illustrates a two jet paddle TVC system, according to an embodiment of the present invention.

Some embodiments of the present invention control attitude of a vehicle using jet paddles and/or movable masses. In some embodiments, an ACS may be part of a flight control system for the vehicle. However, what control system moves the jet paddles and/or movable masses is a matter of design choice, and any computing system or mechanical system capable of achieving such movement and control is within the scope of this disclosure. Furthermore, the vehicles discussed herein may be autonomous, piloted, human controlled from the ground, or any combination thereof.

Jet paddles may be moved near and/or into the exhaust flow of an engine to create a force on the jet paddle, and in some cases, to also deflect the exhaust flow. The engine may be a rocket engine (solid, liquid, or hybrid), an ion thruster, an arcjet, a Hall effect thruster, a turbine engine or other Brayton cycle heat engine, an engine expelling a liquid, or any other engine producing thrust via exhaust flow as a matter of design choice. In certain embodiments, more responsive performance may be achieved in systems with a larger exhaust flow, such as rocket engines and jet engines. Jet paddles may be used with any machine or vehicle with an engine producing thrust via an exhaust flow. In some embodiments, jet paddles may be used to alter the thrust direction of the vehicle producing thrust with an exhaust flow. Such vehicles may include, but are not limited to, fireworks, rockets, aircraft, surface vehicles, hovercraft, and underwater vehicles, among others.

Movable mass is any mass of a vehicle that can be moved to alter the center-of-mass of the vehicle. The movable mass may move inside a main body of a vehicle, outside of the main body of the vehicle, inside-to-outside and/or outside-to-inside of the main body of the vehicle, or any combination thereof. The movable mass may be a solid, liquid, and/or gas. When the center-of-mass of the vehicle is moved relative to the line-of-action of applied forces such as thrust, drag, or lift, a torque can be generated for attitude control or for other purposes as a matter of design choice. In the case of external movable masses that extend from the vehicle, when operating in endoatmospheric flight, or general travel through a fluid, aerodynamic forces from the atmosphere or general fluid forces may further be leveraged to control the attitude of the vehicle (e.g., aerodynamic flaps). Movable mass is not limited to conventional flying vehicles, but may be used for any vehicle traveling through a fluid or empty space, or traveling on a surface, with an applied external force, whether self-propelled or not. Such vehicles may include, but are not limited to, fireworks, ballistic projectiles (e.g., bullets and artillery), bombs, gliders, multiple independently retargetable reentry vehicles (MIRVs), satellites, hovercraft, and underwater vehicles, among others.

A jet paddle is itself a movable mass, but is designed to control the attitude and/or attitude rate of a vehicle by moving it into and/or out of the exhaust flow of the engine of the vehicle. The mass of a jet paddle is typically designed to be negligible relative to the mass of the vehicle. However, the displacement of any mass of a vehicle may alter the location of its center-of-mass.

In some embodiments, jet paddles may be used. In other embodiments, movable mass may be used. In still other embodiments, both jet paddles and movable mass may be used in combination. In certain embodiments, jet paddles and movable mass may be used separately or in combination with other devices providing forces and torques for attitude control.

In order to more clearly explain some embodiments of the present invention, a vehicle with a single engine and a single exhaust nozzle is shown herein. However, a person of ordinary skill in the art will readily understand and appreciate how some embodiments can be applied to a vehicle with multiple engines and/or multiple nozzles.

Roll, as used herein, is a rotation about the axis of symmetry of the exhaust nozzle, and pitch and yaw are rotations orthogonal to this axis. The axis of rotation of pitch is orthogonal to that of yaw. Those of ordinary skill in the art will readily appreciate how these rotations can be defined in other ways.

Jet Paddles

Some embodiments of the present invention perform TVC using two or more movable jet paddles configured with an engine using a high speed exhaust flow to create thrust, e.g., a rocket engine (solid, liquid, or hybrid), a jet engine, an ion thruster, or a water jet propulsion system. A jet paddle TVC system may be part of a machine or part of a vehicle ACS and/or steering system. The jet paddle TVC system may be used to null engine thrust misalignments and/or to steer the vehicle in endoatmospheric flight, exoatmospheric flight, travel through a fluid, travel on a surface, or any combination thereof.

A jet paddle may be a movable solid object with a portion of its exterior surface located aft of the exhaust nozzle of the engine, and may be configured to rotate about a single axis near, into, and/or out of the exhaust flow from the nozzle. A jet paddle may also be translated into and/or out of the exhaust flow, or moved by some combination of translation and rotation. The jet paddle experiences a force from the pressure of the vehicle's exhaust flow, and in some cases may also deflect the exhaust flow, to create a force normal to the axis of symmetry of the nozzle, which approximately corresponds to the direction of the exhaust flow and to the nominal line-of-action of the thrust. The jet paddle may be configured such that at least a portion of its exterior surface can be moved into contact with the vehicle's exhaust flow without creating a stagnation point on the paddle.

For vehicles propelled by an exhaust flow and traveling through a fluid or space, a jet paddle TVC system may be part of a vehicle ACS. Different levels of attitude control may be achieved using different numbers of jet paddles. Two paddles are sufficient to create a positive and negative rotation of the vehicle about a single axis through its center-of-mass, i.e., a pitch, yaw, or roll. Four paddles are sufficient to simultaneously provide pitch and yaw control, pitch and roll control, or yaw and roll control. Six paddles are sufficient to simultaneously provide pitch, yaw, and roll control. However, any number of paddles may be used to provide the desired degree of control in various embodiments. Such configurations provide a reliable, fast response, low power, low mass, low cost, and relatively simple TVC mechanism. While jet paddles may be employed for small rockets in some embodiments, other embodiments may be employed in rockets or other flying vehicles of any size.

FIG. 1 illustrates a two jet paddle TVC system 100, according to an embodiment of the present invention. Jet paddles 130 in this embodiment are thin rectangular plates or slabs with a face exposed to the exhaust flow and are located just aft of nozzle 120 of the rocket motor on rocket-propelled vehicle 110 at the edge of exhaust flow 140. Exhaust flow 140 begins in size as a cylindrical extension of the maximum inside diameter of nozzle 120. Jet paddles 130 pivot about their edge closest to the exit of nozzle 120 in a manner that rotates jet paddles 130 into and out of exhaust flow 140. When jet paddles 130 are rotated away from exhaust flow 140, they do not affect exhaust flow 140, and no thrust vectoring occurs.

However, when a single jet paddle is moved near the flow, as shown on the right, the rotated jet paddle, in effect, forms an asymmetric extension of nozzle 120. Since the exhaust pressure on the rotated jet paddle is greater than that on the opposite jet paddle, a lateral force is created, and rocket-propelled vehicle 110 rotates about its center-of-mass as shown. In this case, the rotation of the top of the vehicle is to the left. There are two ways to remove the lateral force: (1) move the jet paddle in the exhaust flow back away from the exhaust flow; or 2) move the opposite jet paddle into the exhaust flow to create an equal, but opposite, lateral force.

Figure 2:
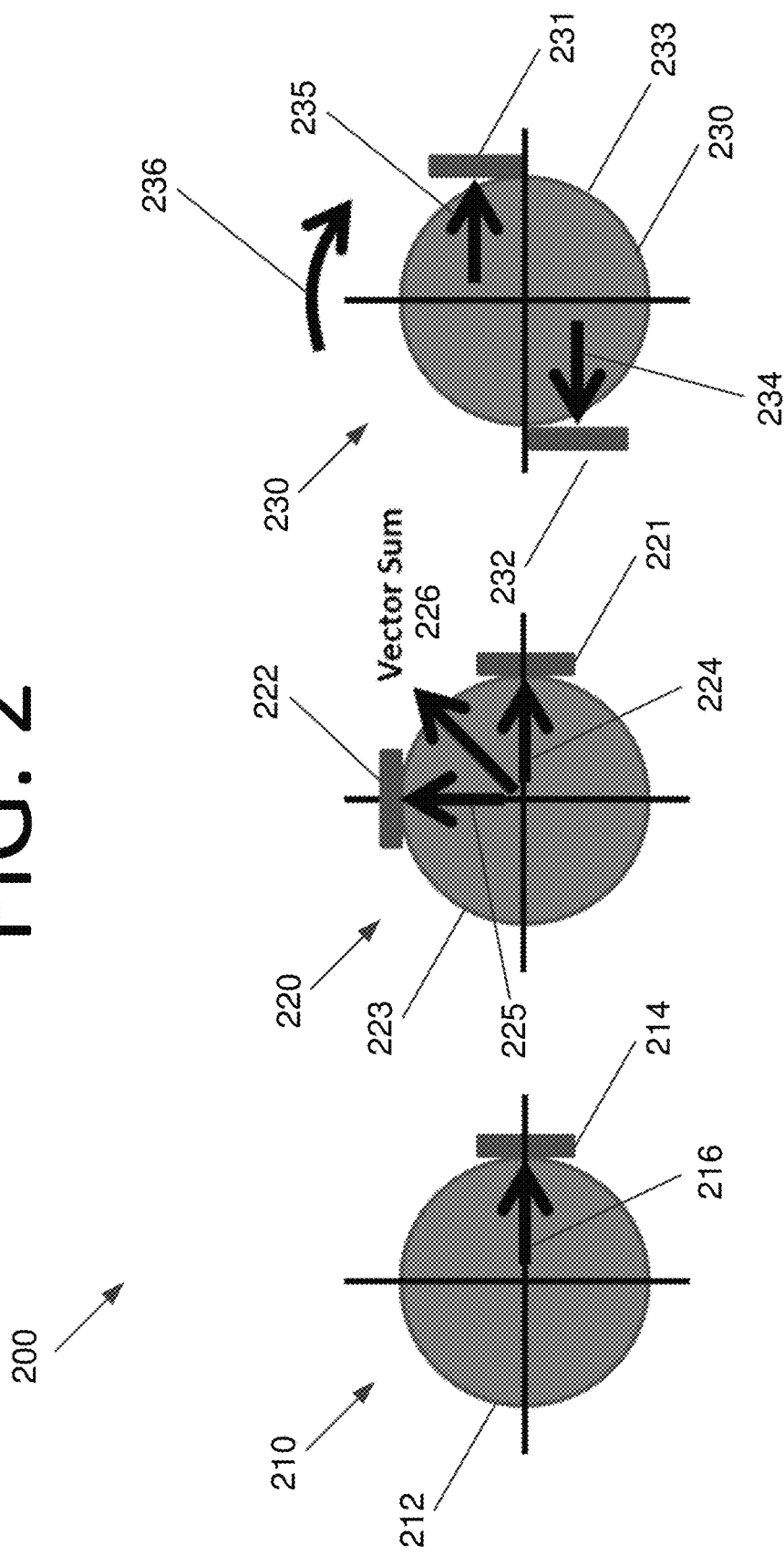
FIG. 2 illustrates jet paddle configurations to create any desired rotation of a thrusting vehicle about its center-of-mass, according to an embodiment of the present invention.

FIG. 2 illustrates jet paddle configurations 200 to create various vehicle rotations. The x-axis and y-axis lines are orthogonal to one another and are also orthogonal to and intersect the axis of symmetry of the respective nozzles of each configuration. The jet paddles in this embodiment are thin rectangular plates or slabs with their faces parallel to the axis of symmetry of the nozzle, which is normal to the page. The view is looking down into an exhaust nozzle and seeing the bottom edge of the jet paddles (i.e., the edge farthest from the nozzle exit). It is assumed in FIG. 2 that the axis of symmetry of the nozzle passes through the center-of-mass of the vehicle.

In configuration 210 shown on the left, the face of a single paddle 214 is centered relative to the center of nozzle 212, and is orthogonal to an axis that is orthogonal to the axis of symmetry of the nozzle, e.g., the x-axis or y-axis. The paddle creates a lateral force 216 having a line-of-action that intersects the axis of symmetry of nozzle 212. Force 216 can be used to pitch or yaw a vehicle, i.e., to rotate a vehicle about an axis that is orthogonal to the axis of symmetry of the nozzle, e.g., the x-axis or y-axis. The single paddle 214 can also be used to roll a vehicle. This can be accomplished, for example, by twisting the paddle about its axis of symmetry parallel to the axis of symmetry of the nozzle. This causes force 216 to rotate in the x-y plane so its line of action misses the axis of symmetry of the nozzle, creating a roll torque.

In configuration 220 shown in the middle, a second paddle 222 is added in addition to first paddle 221 around nozzle 223. This creates a second lateral force 225 orthogonal to a first lateral force 224 from first paddle 221. A vector sum of forces 224 and 225 (i.e., total lateral force 226) is directed between paddles 221 and 222 as shown. By varying the magnitude of each lateral force 224, 225 (e.g., by changing the distance between the respective paddle and the exhaust flow), total lateral force 226 can be in any direction between paddles 221, 222. This effect can be used to create any desired combination of pitch and yaw for a vehicle.

In configuration 230 on the right, two opposing paddles 231, 232 are positioned kitty-corner to one another about nozzle 233 so the normal of their faces misses the axis of symmetry of nozzle 233 by the same distance. This paddle placement creates equal and opposite lateral forces 234, 235 equally spaced from the axis of symmetry of nozzle 233, which causes the vehicle to roll in a roll direction 236 at a certain rate (i.e., rotate about the axis of symmetry of nozzle 233). In each case, how far each paddle is moved, and which paddles are moved, will control both the type of motion that the vehicle experiences and the amount of movement. Multiple types of control may be applied at the same time in some embodiments.

FIG. 3 illustrates a six jet paddle TVC system 300 capable of controlling pitch, yaw, and roll, according to an embodiment of the present invention. The jet paddles are assumed to be thin rectangular slabs or plates with one side facing the axis of symmetry of the nozzle in this embodiment, as described above with respect to FIG. 2. As with FIG. 2, the view is looking into the nozzle. A rocket-propelled vehicle 310 has a nozzle 320 that channels an exhaust flow (not shown). Jet paddles 330 are the only paddle on their respective sides of nozzle 320. Jet paddles 332 are positioned in pairs on opposite sides of nozzle 320. However, in some embodiments, jet paddles 332 are not next to each other and any symmetric or asymmetric paddle configuration may be employed. However, symmetric configurations may provide better performance. The actuator for each paddle is not shown.

In TVC system 300, the white arrows illustrate the direction of the bottom edge of jet paddles 330, 332 into and out of the flow. A hinge may be located along the top edge of each of jet paddles 330, 332, i.e., the edge closest to the base of rocket-propelled vehicle 310 so jet paddles 330, 332 can be rotated into and out of the flow. Alternatively, in certain embodiments, jet paddles 330, 332 may not rotate, but may be translated into and out of the flow in the direction of the arrows.

Other methods of moving jet paddles 330, 332 into and out of the flow are possible. For example, jet paddles 330, 332 may move into and out of the flow such that the paddles are out of the flow when they are above the bottom of the nozzle (or alongside the nozzle), and they are in the flow (or adjacent to the flow) when they are moved past the end of the nozzle in the direction of the flow. In other words, jet paddles 330, 332 may move in a direction orthogonal to the page of FIG. 3 in some embodiments. Methods of moving jet paddles 330, 332 into and out of the flow using a combination of rotations and translations are also possible. See, for example, FIG. 4.

When the pressure distribution on jet paddles 330, 332 surrounding the nozzle is asymmetric, a net force normal to the nominal direction of the exhaust flow results. This force can be used to adjust the attitude of rocket-propelled vehicle 310 in a desired manner, i.e., in pitch, yaw, and/or roll. Any desired motive mechanism can be used to move jet paddles 330, 332 into and out of the exhaust flow, e.g., electrical actuators, hydraulic actuators, pneumatic actuators, a combination thereof, etc. The shape, thickness, and composition of jet paddles 330, 332 can be tailored to the specific application. Jet paddles 330, 332 and their actuators can be permanently attached to rocket-propelled vehicle 310, or can be designed to be removable and reusable. The jet paddle approach is scalable. It can be used on rocket motors as small as those for model rockets (e.g., 2.4 cm diameter×6.9 cm long), and as large as motors for commercial launch vehicles.

In some embodiments, any number of jet paddles may be positioned next to one another. In such embodiments, instead of having pairs of jet paddles next to one another as in jet paddles 332, three jet paddles, five jet paddles, or any desired number of jet paddles may be next to one another. The jet paddles may or may not be physically touching, and when they are not touching, the gaps between them may vary as a matter of design choice. Furthermore, in some embodiments, there may not be a corresponding jet paddle on the opposite side of the vehicle for one or more jet paddles. Increasing the number of jet paddles may provide finer control. However, this may also increase the complexity and cost of the TVC system.

FIG. 4 illustrates a rocket-propelled vehicle 400 with a jet paddle 410 configured to move by rotation, translation, or a combination of rotation and translation, according to an embodiment of the present invention. Rocket-propelled vehicle 400 has a nozzle 420 that channels an exhaust flow (not shown). Jet paddle 410 may translate, rotate, or both. Translation may be in any direction in the page of FIG. 4. The actuator for jet paddle 410 is not shown.

In principle, the use of jet paddles is similar to using jet vanes, but has distinct advantages. One significant advantage is that jet paddles have considerably less exposure to the hot gases and particulates of the exhaust flow, such as solid propellants with aluminum. A jet vane is fully immersed in the exhaust flow and therefore is heated to exhaust stagnation temperatures. Stagnation temperatures of 3,310-3,588K, or 5,500-6,000° F., are typical in conventional jet vane systems. This restricts the composition of jet vanes to materials that can be exposed to a high temperature, such as graphite, rhenium, tungsten-copper, or tungsten carbide/stainless steel.

When used with solid propellants containing aluminum or other corrosive materials, practical jet vanes should be relatively thick so they remain effective while being eroded away. For certain applications, such as interceptor missiles, erosion of jet vanes may not be a large concern as the rocket motor burn time is generally relatively short and the missile is intended to be destroyed at the end of its flight. However, jet vanes may not be suitable for missiles or other rocket-propelled vehicles with relatively long motor burn times due to the longer periods of jet vane heating and erosion, and the need for thicker and higher temperature jet vanes. Furthermore, the erosion of jet vanes generally makes them ill-suited for reusable vehicle applications. Since jet paddles need not be continuously and directly in the exhaust flow and therefore need not have a stagnation point, the heating and erosion environment for jet paddles is an order of magnitude less than that for jet vanes. Consequently, a jet paddle may be made of a wider variety of materials, such as iron, steel, stainless steel, various ceramics, etc.

Another advantage of jet paddles relative to jet vanes is the design freedom available for the size and shape thereof. In jet vanes, the nozzle exit diameter imposes restrictions on the size of the jet vanes. Due to the difference in orientations and locations, this is not the case for jet paddles. The length of a jet paddle is essentially unconstrained, and hence, its surface area is also essentially unconstrained. This affords significant flexibility in jet paddle shape and size, and therefore performance.

Another significant advantage of the jet paddle TVC approach that is lacking in some of the other TVC approaches is its scalability with the size of the vehicle. Generally speaking, the mission requirements of missiles, rockets, spacecraft, and other similar vehicles include kinematic parameters such as translational and angular accelerations. As the size of the vehicle is reduced, so too is its mass, and therefore so too are the forces and torques required to achieve these accelerations. Thus, the thrust of the vehicle generally scales with its size. Since the size of the jet paddles and also the force needed to operate their actuators generally scale with the exhaust thrust, the wide variety and availability of very small actuators means that jet paddle TVC systems can scale with the size of the vehicle. This is not necessarily the case for other TVC systems that deflect the nozzle or engine, or inject fluid into the exhaust flow. There is a limit to the dimensions of gimbal systems and to the dimensions of tubing of fluid injection systems due to manufacturing, handling, and mounting constraints of these components.

Figure 5A:
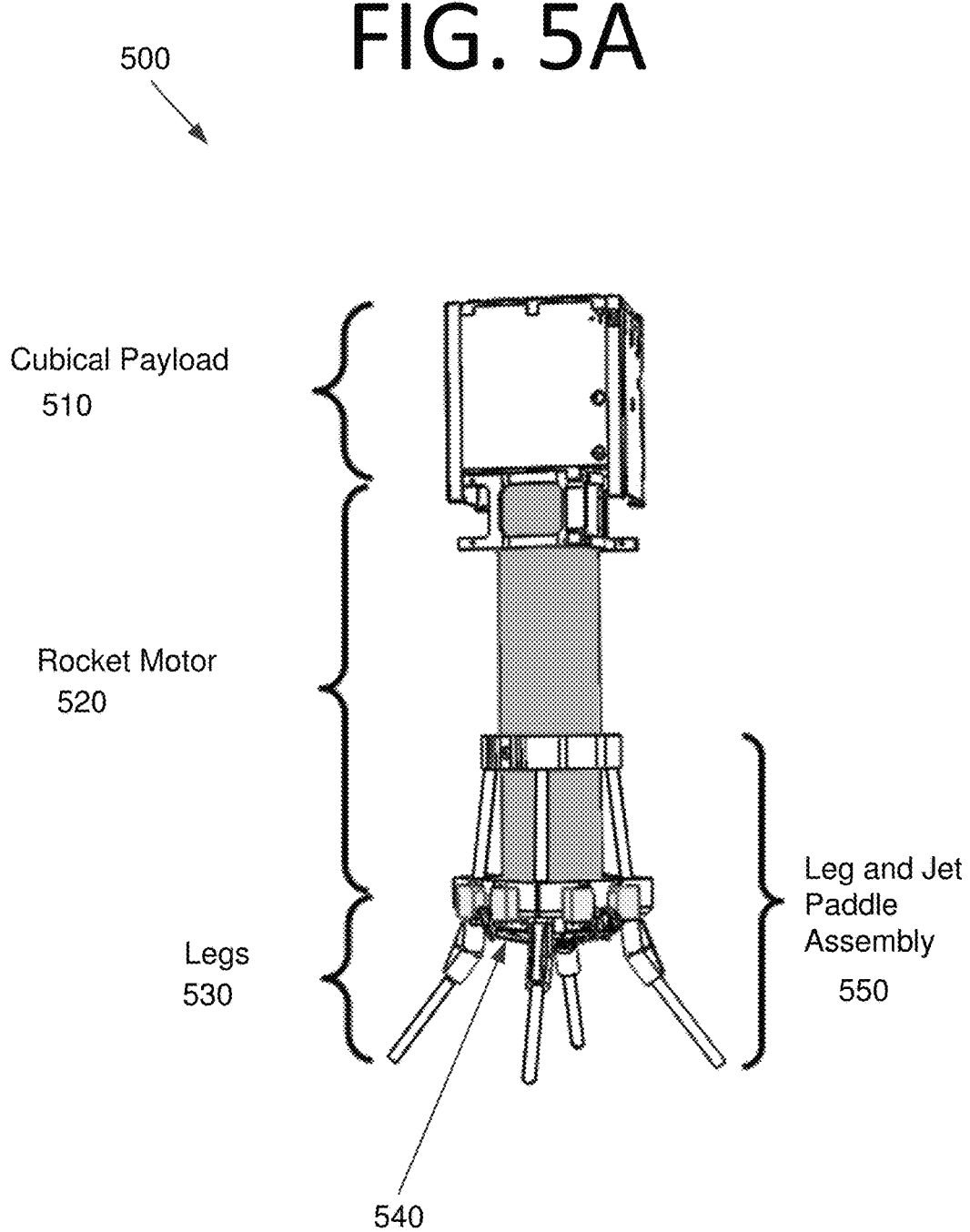
FIG. 5A is a solid-model rendering illustrating a side view of a prototype of a rocket propelled vehicle with an eight jet paddle TVC system, according to an embodiment of the present invention.
Figure 5B:
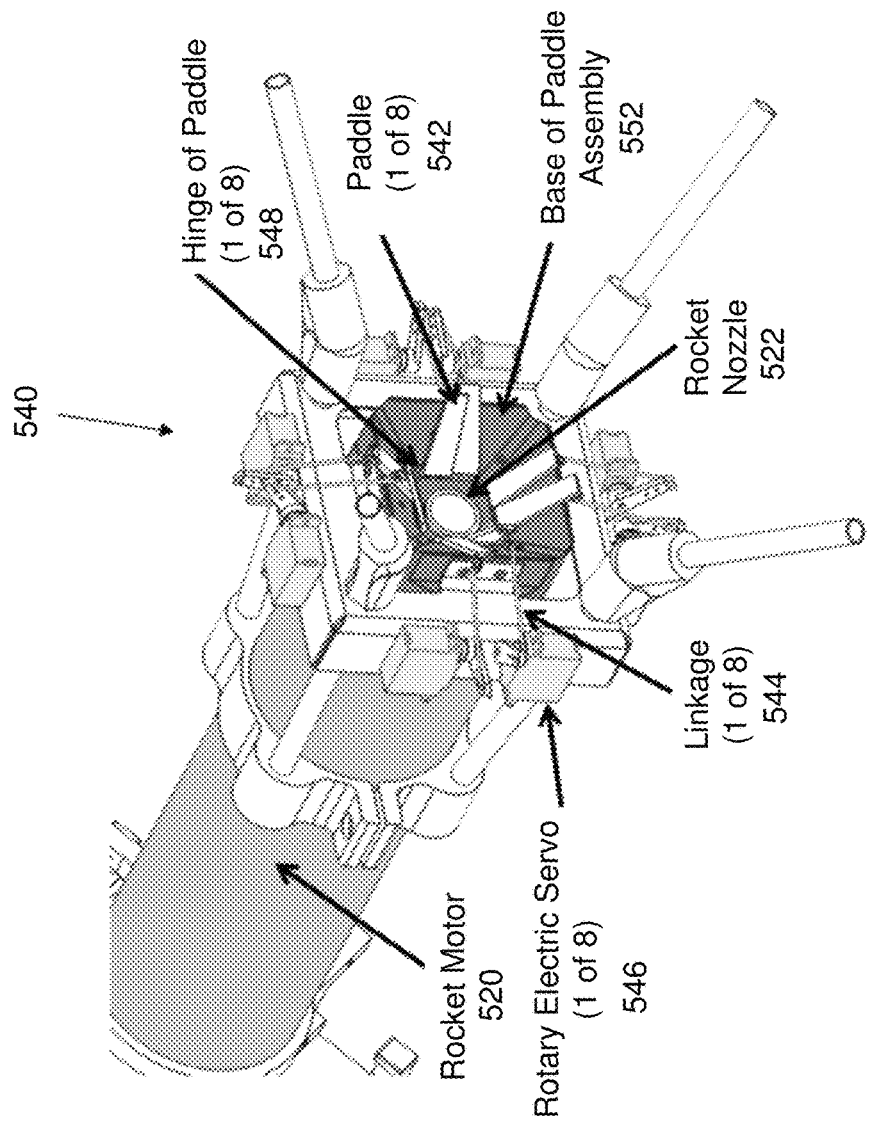
FIG. 5B is a solid-model rendering illustrating a bottom view of the eight jet paddle TVC system, according to an embodiment of the present invention.

FIG. 5A is a solid-model rendering illustrating a side view of a prototype of a rocket propelled vehicle 500 with an eight jet paddle TVC system 540, according to an embodiment of the present invention. FIG. 5B is a solid-model rendering illustrating a bottom view of eight jet paddle TVC system 540, according to an embodiment of the present invention. Rocket-propelled vehicle 500 is a small 2 kg exoatmospheric rocket-propelled vehicle with a 5.7 cm diameter×25 cm long (2.25 inch diameter×10 inch long) cylindrical, solid propellant rocket motor 520 weighing 1 kg with 60 N thrust and a 7 second burn time. Rocket motor 520 is located beneath a 10 cm×10 cm×10 cm (4 inch×4 inch×4 inch) cubical payload 510 weighing 1 kg. Vehicle 500 has four legs 530 to protect the paddle assembly during landing after flight, and to hold it upright for display.

Eight jet paddle TVC system 540 is attached to the bottom of rocket motor 520. Legs 530 and TVC system 540 are part of leg and jet paddle assembly 550, which includes a base 552. TVC system 540 has eight individually controlled Inconel™ paddles 542. Each paddle is approximately 2.5 cm long×0.64 cm wide×1.3 mm thick (1 inch long×0.25 inch wide×0.05 inch thick), and includes a hinge 548. Pairs of paddles 542 are positioned next to one another and separated by a small gap. Paddles 542 can be moved into and out of the flow by a respective linkage 544 connected to a respective electrically powered rotary servo 546. Each servo 546 is powered at 5 V and consumes about 1 W. Paddles 542 can move at a speed of 600 degrees/sec (no load) in this embodiment. Four of the eight paddles 542 are shown in their stow position, 30° away from the axis of symmetry of nozzle 522. When rotated 10° into the flow relative to the axis of symmetry of nozzle 522, each paddle 542 can generate a lateral force of approximately 4 N.

Rocket-propelled vehicle 500 was subjected to a test flight on Aug. 28, 2013. Rocket motor 520 burned for 7 seconds during this flight. Jet paddle TVC system 540 was commanded by a 100 Hz update rate attitude control loop that provided full attitude control of vehicle 500 while it was thrusting. Paddles 542 showed no sign of thermal or erosion damage after the flight. This flight demonstrated that a jet paddle TVC system can effectively control the attitude of small rocket vehicles.

Figure 6:
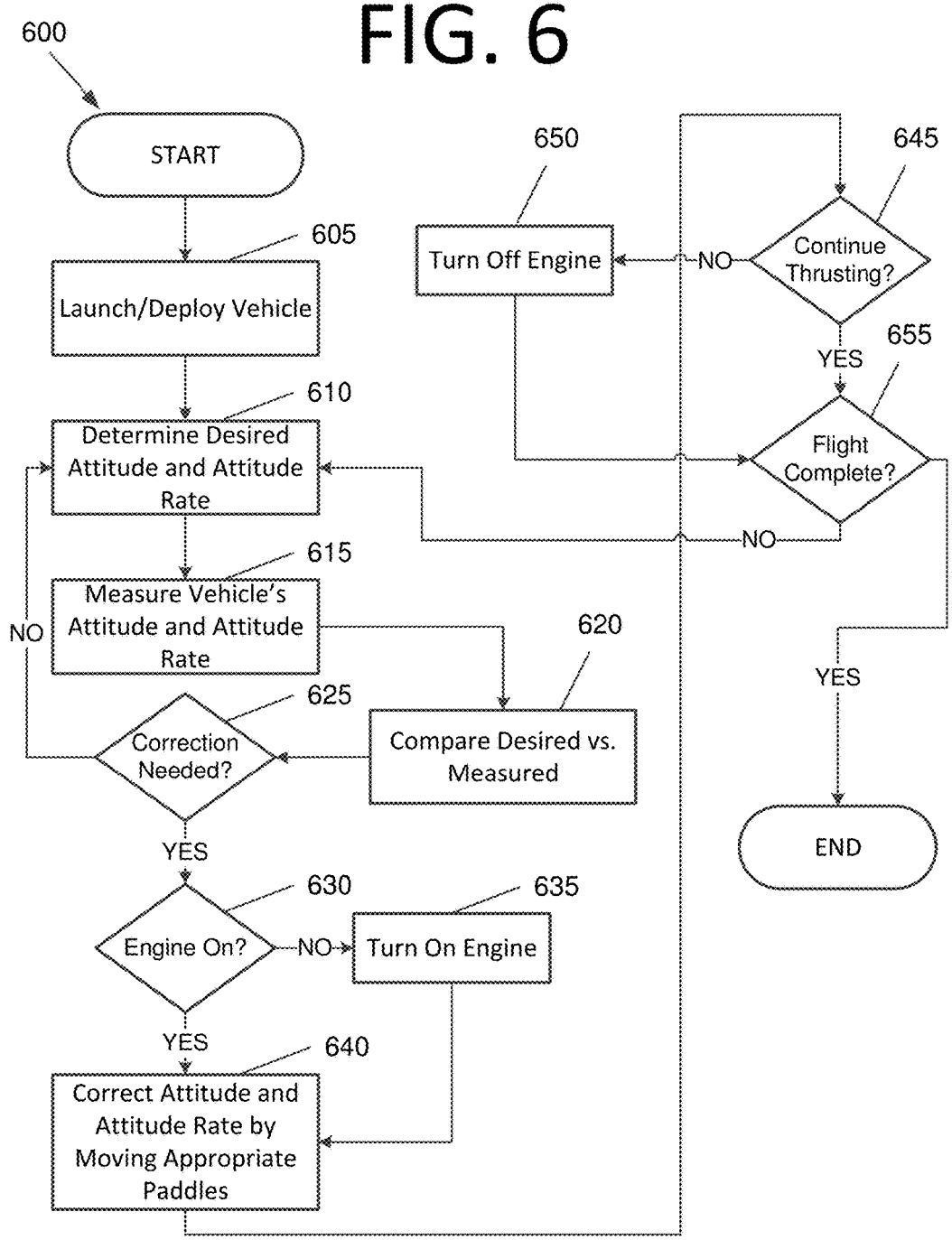
FIG. 6 is a flowchart illustrating a process for performing attitude and/or attitude rate control and compensation for thrust misalignment using a jet paddle ACS, according to an embodiment of the present invention.

FIG. 6 is a flowchart 600 illustrating a process for performing attitude and/or attitude rate control and compensation for thrust misalignment using a jet paddle ACS, according to an embodiment of the present invention. Such changes may be affected by changing a thrust direction of a vehicle. A jet paddle TVC system is configured for the vehicle with an ACS and an engine producing thrust using an exhaust flow for propelling the vehicle. In some embodiments, attitude and/or attitude rate control using TVC may be performed by computing system 1200 of FIG. 12 controlling actuators for one or more jet paddles. The process begins with launching/deploying the vehicle at 605 by activating the engine or other propulsion approach, such as a catapult, electromagnetic launcher or rail gun, detaching the vehicle from another flying vehicle, or any other desired approach, such that the vehicle is in flight. The desired attitude and attitude rate are determined at 610 and the vehicle's attitude and attitude rate are measured at 615. The system then compares the desired attitude and attitude rate to the measured attitude and attitude rate at 620. If the current (measured) attitude and/or attitude rate do not need to be changed at 625, the process returns to step 610.

However, if correction is needed at 625, the system checks whether the engine is on at 630. If the engine is not on at 630, the engine is turned on at 635, and the process proceeds to 640. If the engine is already on at 630, the process proceeds to step 640.

At 640, the appropriate jet paddles are moved to correct the attitude and/or attitude rate. If the engine should not continue thrusting at 645, the engine is turned off at 650. If the flight is not complete at 655, the process returns to step 610. Otherwise, the process ends.

The thrust of the vehicle, how far each paddle is moved, and which paddles are moved, will control both the type of rotation that the vehicle experiences and the amount of rotation. Multiple types of control may be applied at the same time in some embodiments. It should be noted that one or more of the same jet paddles may have to be moved to a different position to perform simultaneous control of two or more of pitch, yaw, and roll than would be needed to control only one of these rotations. The system accounts for this during its calculations.

Movable Masses

Some embodiments of the present invention control the attitude of a vehicle using movable masses. The movable mass may be a solid, a liquid, a gas, or any combination thereof. The movable mass may move inside a main body of a vehicle, outside the main body of the vehicle, inside-to-outside and/or outside-to-inside of the main body of the vehicle, or any combination thereof. A movable mass system takes advantage of all applied forces on a vehicle, e.g., thrust, lift, and drag, and can therefore be called a force vector control system (c.f., a thrust vector control system). The movable mass force vector control system may be part of a vehicle ACS. The movable mass ACS may be used to null engine thrust misalignments and to steer the vehicle in endoatmospheric flight, exoatmospheric flight, travel through a fluid, travel on a surface, or any combination thereof. When the lines of action of the thrust and aerodynamic or other applied forces acting on the vehicle do not pass through the center-of-mass of the vehicle, a torque is created about the center-of-mass. This causes the attitude of the vehicle to change in accordance with the torque. Thus, by moving mass in the vehicle in an appropriate way, the center-of-mass can be moved relative to the lines of action of the forces, and a torque can be generated for attitude and/or attitude rate control. As the attitude of the vehicle changes, the thrust direction also changes, as typically does the magnitude of any lift and drag forces, allowing the vehicle to be steered.

Mass can be moved in a variety of ways—solenoids, motors, magnetic fields, fluid flow, etc. In the case where magnetic or other force fields are used, movable mass need not be physically attached to the vehicle at all, but instead can be "suspended" using the magnetic or other fields. The quantity, size, distribution, range of motion, speed, and acceleration of the movable mass may be tailored to a specific application. For some applications, the mass, size, and power needs of a movable mass system may be lower than those of a more traditional ACS. This may make a movable mass system particularly suitable for use in small vehicles.

Figure 7:
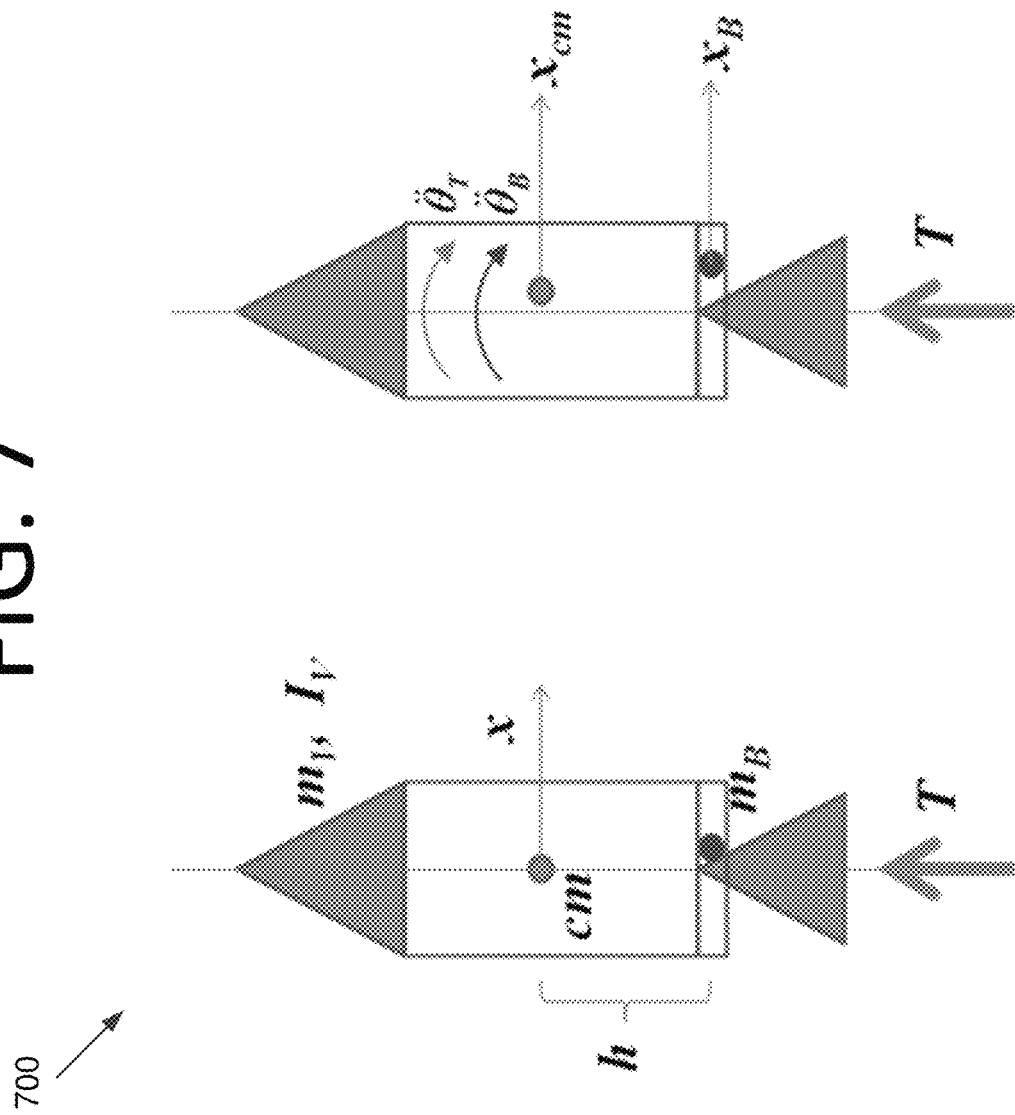
FIG. 7 illustrates a rocket-propelled exoatmospheric vehicle where torque is controlled via internal movable masses, according to an embodiment of the present invention.

FIG. 7 illustrates a rocket-propelled exoatmospheric vehicle 700 where torque is controlled via internal movable masses, according to an embodiment of the present invention. In this example, only two dimensions and one force (thrust) are considered for simplicity. The left image shows the case where the thrust line-of-action is perfectly aligned with the longitudinal axis or axis of symmetry of the vehicle and passes through the center-of-mass. The thrust is denoted T, the mass of vehicle 700 $m_V$, the relevant moment of inertia $I_V$, the mass of the "movable mass" $m_B$, which is typically less than $m_V$, and the distance from the center-of-mass to the line-of-motion of the movable mass h. The angle θ corresponds to pitch or yaw. For simplicity, the line-of-motion of $m_B$ is orthogonal to the thrust line-of-action. The coordinate in the line-of-motion direction is x. As the ACS moves $m_B$ an amount $x_B$, the center-of-mass moves an amount $x_{cm}$. Two torques are created—one due to the thrust and its lever arm $x_{cm}$, which corresponds to an angular acceleration $\ddot{\theta}_T$, and another due to the reaction force of the vehicle caused by the acceleration of the movable mass $x_B$, and its lever arm h, which corresponds to an angular acceleration $\ddot{\theta}_B$. The sum of these two angular accelerations is the net angular acceleration of vehicle 700. Once the movable mass stops accelerating, only $\ddot{\theta}_T$ remains. The following equations provide these angular accelerations:

$$x_{cm} = \left(\frac{m_B}{m_V + m_B}\right) x_B$$

$$\ddot{\theta}_T = \frac{T x_{cm}}{I_V + m_B x_B^2}$$

$$\ddot{\theta}_B = \frac{m_B \ddot{x}_B h}{I_V + m_B x_B^2}$$

$$\ddot{\theta}_{NET} = \ddot{\theta}_T + \ddot{\theta}_B$$

The right image can be considered the case of a thrust misalignment ($m_B$ is initially not moving relative to vehicle 800 in this case). To nullify the torque due to this thrust misalignment, $m_B$ is moved so that the center-of-mass intersects the line-of-action of the thrust, as shown in the left image. The location and path of $m_B$ shown in FIG. 7 is for purposes of illustration only. The location and path of the movable mass can be anywhere in some embodiments (i.e., inside, outside, and/or inside and outside of the vehicle), provided it is attached or otherwise affixed (e.g., via magnetic fields) to the vehicle and changes the center-of-mass location of the vehicle. The quantity of mass that is moved, the path over which the mass moves, and the speed and acceleration with which the mass is moved depends on the requirements of the ACS and the desired attitude correction. Roll can also be controlled in some embodiments if a force that is not parallel to the roll axis is also acting on the vehicle, such as lift or drag force in endoatmospheric flight, or any other suitable force.

A significant feature of some embodiments is their scalability with the mass and size of the vehicle. Generally speaking, the mission requirements of missiles, rockets, spacecraft, and other similar vehicles include kinematic parameters such as translational and angular accelerations. As the mass of a vehicle is reduced, the forces and torques required to achieve these accelerations are also reduced. The quantity of movable mass required to shift the center of mass and achieve a specified level of attitude control authority is also reduced proportionately. Since there are a wide range of miniature actuators available for moving mass, the movable mass ACS of some embodiments can be very small and may be appropriate for very small vehicles. This is not necessarily the case for conventional ACSs, especially those that require TVC systems and thrusters.

Figure 8:
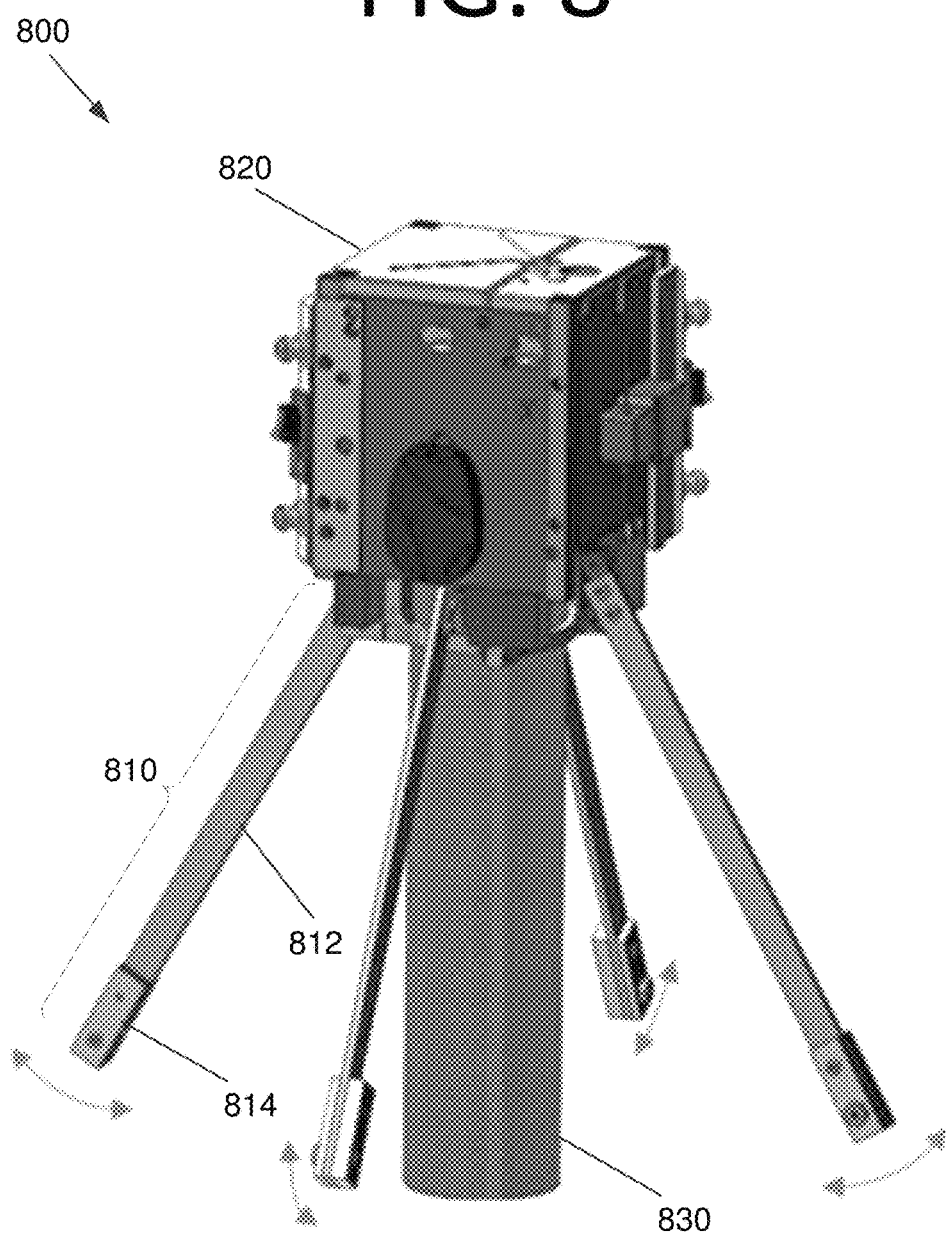
FIG. 8 is a solid-model rendering of a rocket propelled vehicle with an external movable mass pitch/yaw ACS, according to an embodiment of the present invention.

Embodiments of the movable mass ACS may use internal movable masses, external movable masses, internal-to-external movable masses, external-to-internal movable masses, or any combination thereof. As such, a large number of embodiments are possible. FIG. 8 illustrates a solid-model rendering of a rocket propelled vehicle 800 with an external movable mass pitch/yaw ACS, according to an embodiment of the present invention. Vehicle 800 is a 2 kg rocket-propelled exoatmospheric vehicle that uses four external movable masses 810 for thrust misalignment mitigation and attitude control of vehicle 800. The mass of vehicle 800 is evenly split between a 1 kg cubical payload 820 that includes the sensors, computing system, and battery of a movable mass pitch/yaw ACS (not shown) and a 1 kg cylindrical solid rocket motor 830 (50 N×30 sec) beneath it. The mass of each arm 812 with its end mass 814 is 3.7% of the total mass of vehicle 800 in this embodiment. The mass of the four external movable masses 810 and their actuators is about 18% of the total mass of vehicle 800. However, other mass percentages, masses, and numbers of arms may be used in other embodiments. This system is capable of handling up to 1.7° of thrust misalignment (about 10 times that of tactical solid rocket motors).

Rocket-propelled vehicle 800 was fabricated and subjected to a test flight on Jun. 28, 2012. Rocket motor 830 burned for seven seconds during this flight. The movable mass pitch/yaw ACS was commanded by a 10 Hz update rate control loop that provided full pitch/yaw control while the vehicle was thrusting. This flight demonstrated that a movable mass pitch/yaw ACS can effectively control the pitch/yaw of small rocket vehicles.

Figure 9:
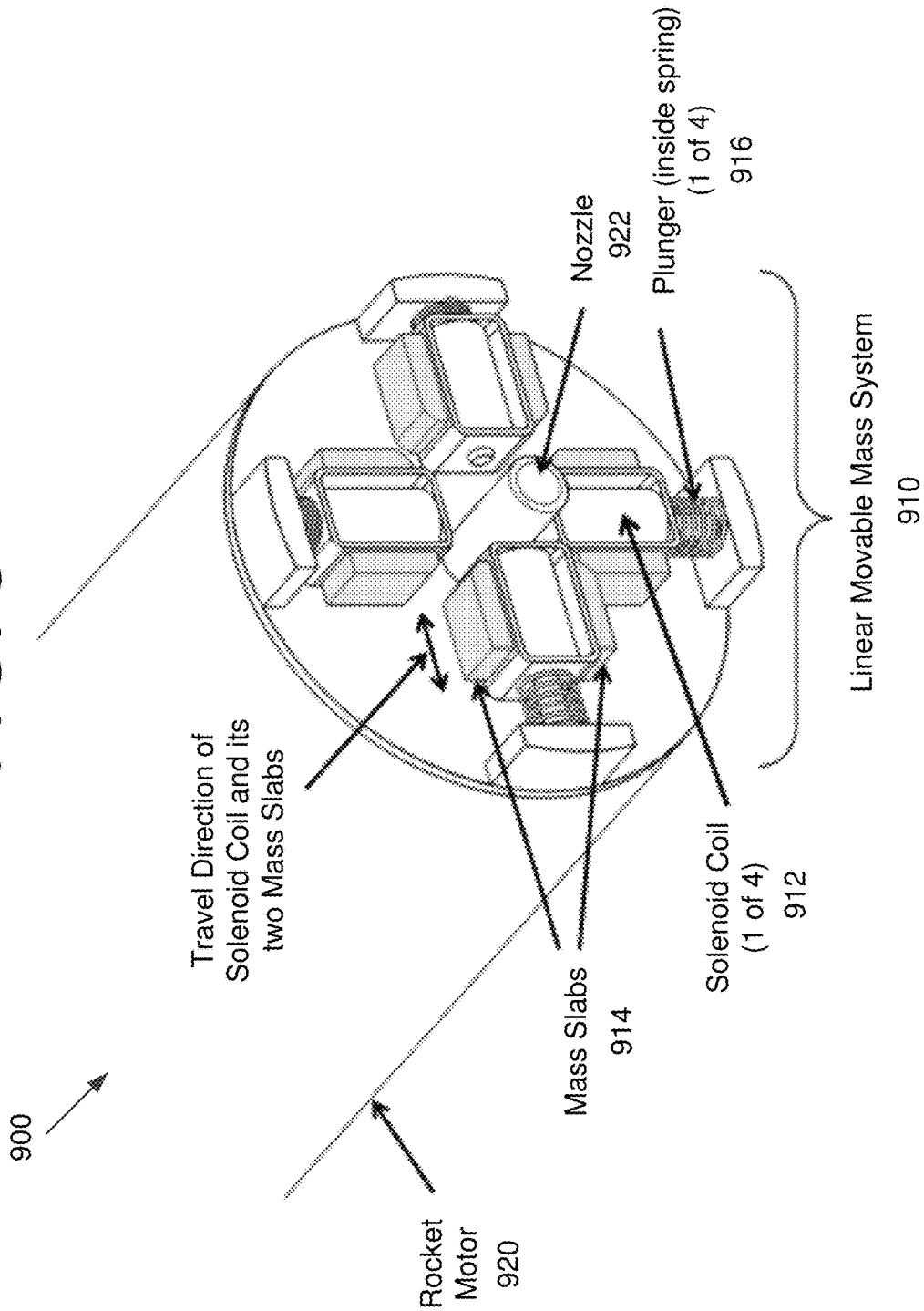
FIG. 9 illustrates a prototype vehicle configured to perform movable mass attitude control using linear actuators within the lateral external envelope of the vehicle, according to an embodiment of the present invention.

FIG. 9 is a solid-model rendering illustrating a prototype vehicle 900 configured to perform movable mass attitude control using linear actuators within the lateral external envelope of vehicle 900, according to an embodiment of the present invention. Exhaust gases exit via nozzle 922. A linear movable mass system 910 is designed for attachment to the bottom of a 5.6 cm diameter rocket motor 920. The hardware shown in this embodiment was designed for test purposes and not for flight.

The movable mass is a solenoid coil 912 with two rectangular mass slabs 914 attached on either side. When solenoid coil 912 is energized, it travels back and forth on its cylindrical shaft or plunger 916, which is attached to rocket motor 920. Mass slabs 914 can be extended in length parallel to the longitudinal axis of the cylinder to increase the amount of mass that is moved.

Figure 10:
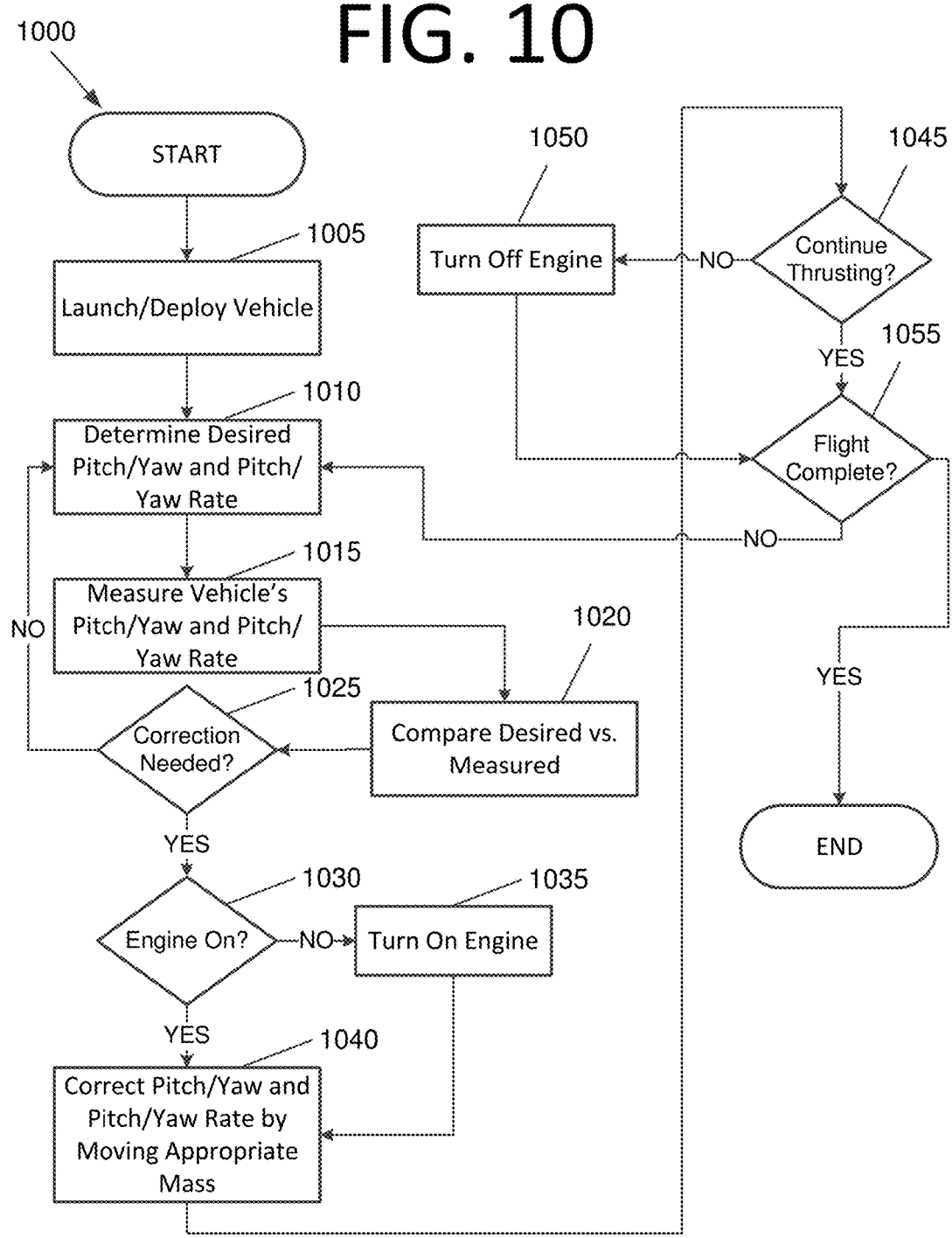
FIG. 10 is a flowchart illustrating a process for performing pitch/yaw and/or pitch/yaw rate control, and compensation for thrust misalignment, using a movable mass ACS, according to an embodiment of the present invention.

FIG. 10 is a flowchart 1000 illustrating a process for performing pitch/yaw and/or pitch/yaw rate control, and compensation for thrust misalignment, using a movable mass ACS, according to an embodiment of the present invention. A movable mass TVC system is configured for an exoatmospheric vehicle with an ACS and an engine producing thrust for propelling the vehicle. The thrust acts along the nominal roll axis and is the only external applied force acting on the vehicle for this embodiment. In certain embodiments, a second force in addition to thrust that is non-parallel with the roll axis may be present and used for performing roll and/or roll rate control, making available full attitude and attitude rate control. This second force may typically be the sum of lift and/or drag forces. In some embodiments, attitude and/or attitude rate control using force vector control may be performed by computing system 1200 of FIG. 12 controlling actuators for one or more movable masses.

The process begins with launching/deploying the vehicle at 1005 by activating the engine or other propulsion approach, such as a catapult, electromagnetic launcher or rail gun, detaching the vehicle from another flying vehicle, or any other desired approach, such that the vehicle is in flight. The desired pitch/yaw and pitch/yaw rate are determined at 1010 and the vehicle's pitch/yaw and pitch/yaw rate are measured at 1015. The system then compares the desired pitch/yaw and pitch/yaw rate to the measured pitch/yaw and pitch/yaw rate at 1020. If the current (measured) pitch/yaw and/or pitch/yaw rate do not need to be changed at 1025, the process returns to step 1010.

However, if correction is needed at 1025, the system checks whether the engine is on at 1030. If the engine is not on at 1030, the engine is turned on at 1035, and the process proceeds to step 1040. If the engine is already on at 1030, the process proceeds to step 1040.

At 1040, the appropriate movable masses are moved to correct the pitch/yaw and/or pitch/yaw rate. If the engine should not continue thrusting at 1045, the engine is turned off at 1050. If the flight is not complete at 1055, the process returns to step 1010. Otherwise, the process ends.

The forces on the vehicle, how far each movable mass is moved, and which movable masses are moved, will control both the type of rotation that the vehicle experiences and the amount of rotation. Multiple types of control may be applied at the same time in some embodiments. It should be noted that one or more of the same movable masses may have to be moved to a different position to perform simultaneous control of pitch and yaw than would be needed to control only one of these rotations. The system accounts for this during its calculations.

Combined Jet Paddles and Movable Masses

Some embodiments of the present invention use a combination of jet paddles and movable masses to perform attitude and/or attitude rate control. Such embodiments may be able to achieve faster response and realize stronger control forces than either approach individually. Further, in certain embodiments, one approach may perform better in endoatmospheric conditions (or more generally, travel through a fluid) and another may perform better in exoatmospheric conditions (or more generally, travel in space). For instance, external movable masses that extend outward from the vehicle may be able to leverage drag forces to generate control forces in endoatmospheric operation. Also, an exoatmospheric vehicle with a single engine and no included TVC cannot achieve full attitude control with moveable mass. However, such a vehicle can use moveable mass for pitch/yaw control and jet paddles for roll control. Naturally, the jet paddles can also be used to affect or augment pitch/yaw control as well.

Figure 11:
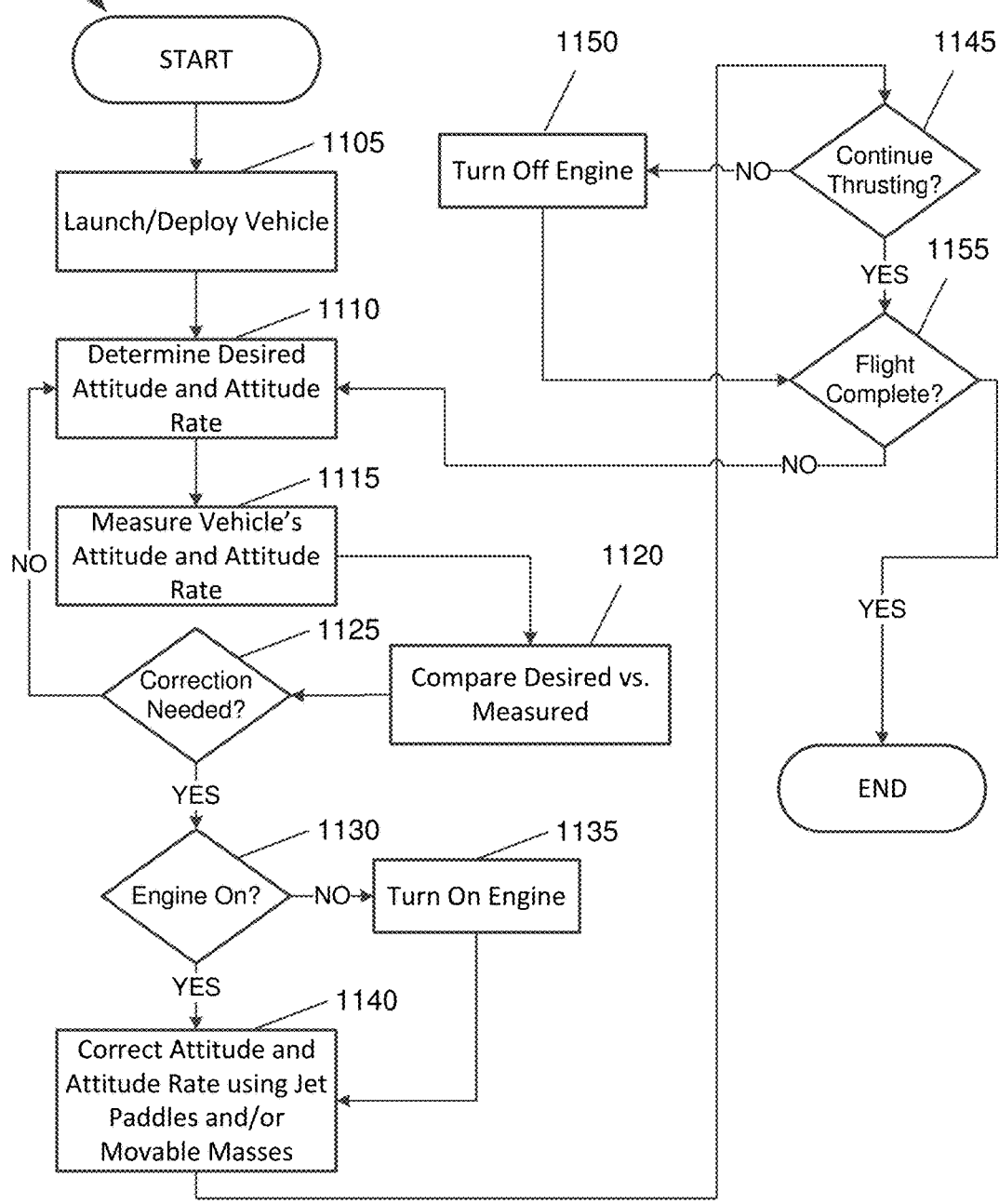
FIG. 11 is a flowchart illustrating a process for performing attitude and/or attitude rate control, and compensation for thrust misalignment, using a combination jet paddle and movable mass ACS, according to an embodiment of the present invention.

FIG. 11 is a flowchart 1100 illustrating a process for performing attitude and/or attitude rate control, and compensation for thrust misalignment, using a combination jet paddle and movable mass ACS, according to an embodiment of the present invention. A combination jet paddle and movable mass TVC system is configured for an exoatmospheric vehicle with an ACS and an engine producing thrust and exhaust flow for propelling the vehicle. The thrust acts along the nominal roll axis and is the only external applied force acting on the vehicle for this embodiment. In some embodiments, attitude and/or attitude rate control may be performed by computing system 1200 of FIG. 12.

The process begins with launching/deploying the vehicle at 1105 by activating the engine or other propulsion approach, such as a catapult, electromagnetic launcher or rail gun, detaching the vehicle from another flying vehicle, or any other desired approach, such that the vehicle is in flight. The desired attitude and attitude rate are determined at 1110 and the vehicle's attitude and attitude rate are measured at 1115. The system then compares the desired attitude and attitude rate to the measured attitude and attitude rate at 1120. If the current (measured) attitude and/or attitude rate do not need to be changed at 1125, the process returns to step 1110.

However, if correction is needed at 1125, the system checks whether the engine is on at 1130. If the engine is not on at 1130, the engine is turned on at 1135, and the process proceeds to step 1140. If the engine is already on at 1130, the process proceeds to step 1140.

At 1140, the appropriate jet paddles and/or movable masses are moved to correct the attitude and/or attitude rate. If the engine should not continue thrusting at 1145, the engine is turned off at 1150. If the flight is not complete at 1155, the process returns to step 1110. Otherwise, the process ends.

Figure 12:
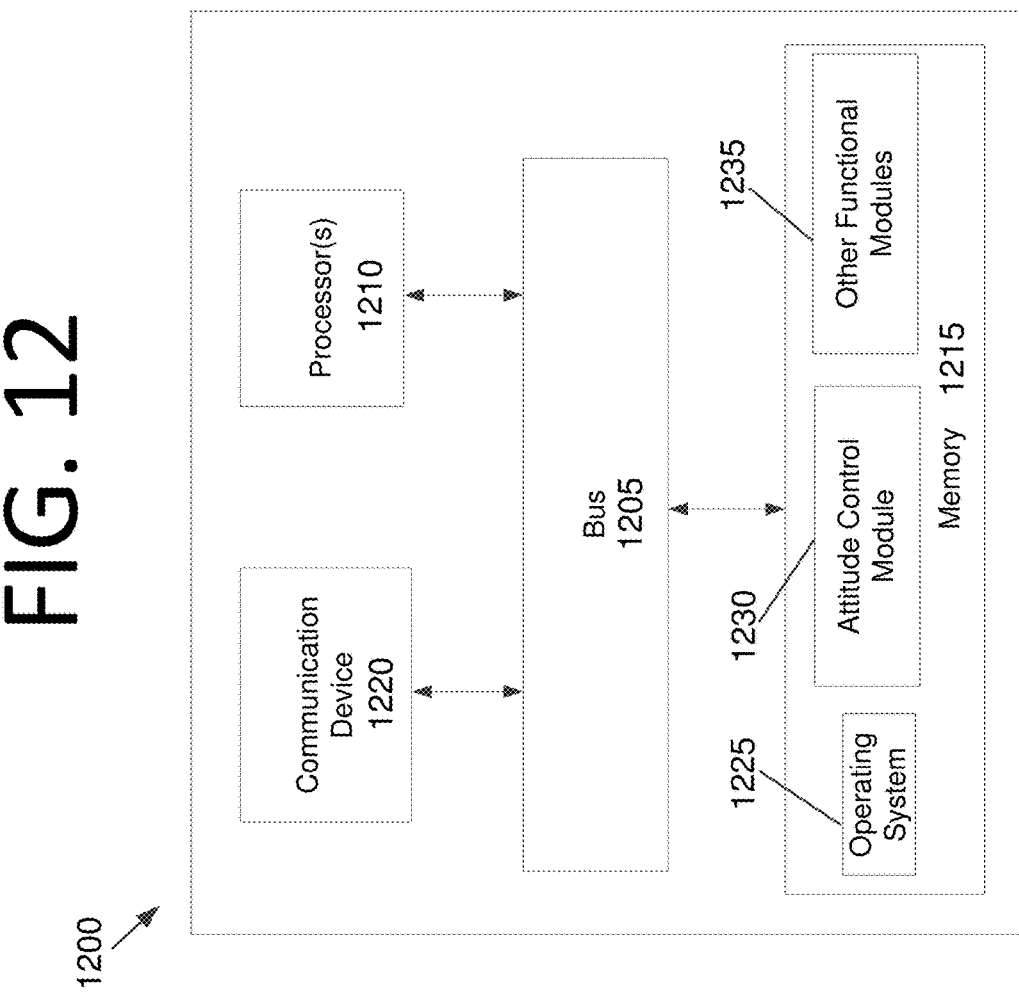
FIG. 12 is a block diagram of a computing system configured to control attitude of a vehicle using jet paddles and/or movable masses, according to an embodiment of the present invention.
Figure 13:
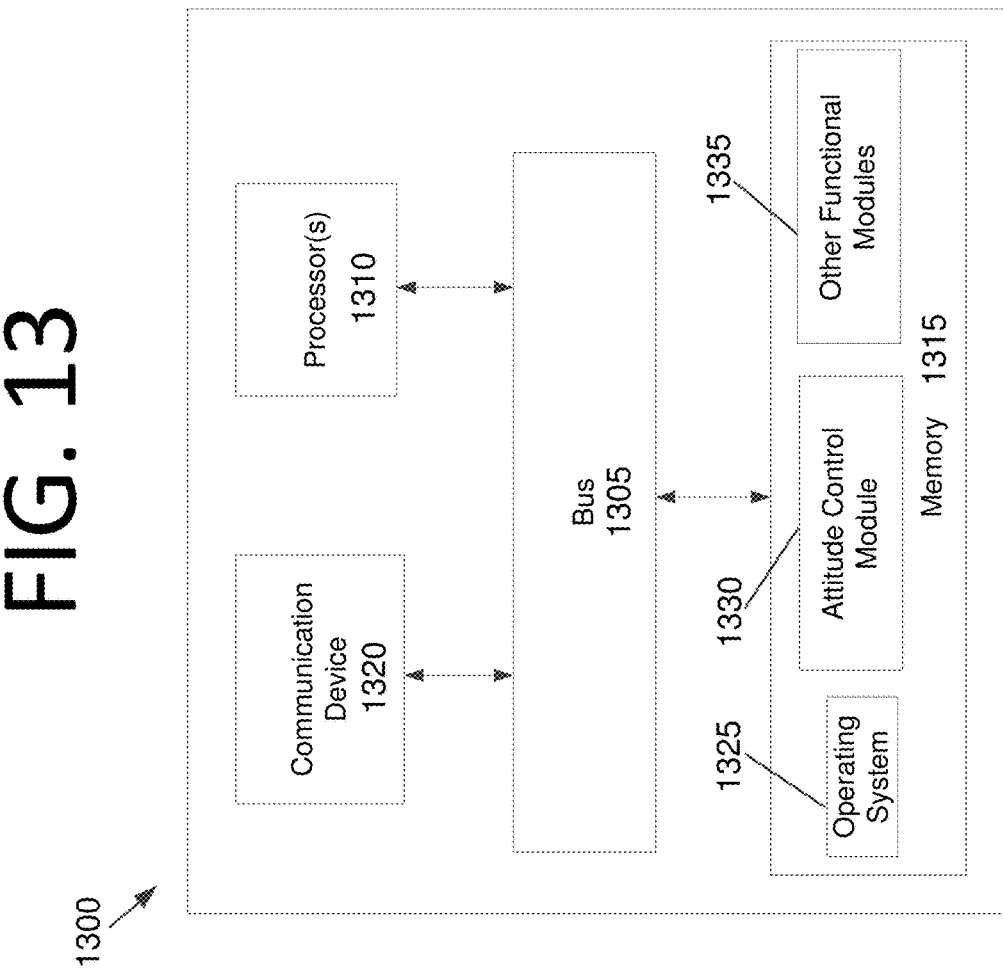

FIG. 12 is a block diagram 1200 of a computing system (hereinafter "system") configured to control attitude and/or attitude rate of a vehicle using jet paddles and/or movable masses, according to an embodiment of the present invention. System 1200 may control the position of jet paddles and/or movable masses via actuators, solenoids, or any other suitable mechanism that drives the movement thereof. System 1200 includes a bus 1205 or other communication mechanism for communicating information, and processor(s) 1210 coupled to bus 1205 for processing information. Processor(s) 1210 may be any type of general or specific purpose processor, including a central processing unit (CPU) or application specific integrated circuit (ASIC). System 1200 further includes a memory 1215 for storing information and instructions to be executed by processor(s) 1210. Memory 1215 can be comprised of any combination of random access memory ("RAM"), read only memory ("ROM"), flash memory, cache, static storage such as a magnetic or optical disk, or any other types of non-transitory computer-readable media or combinations thereof. Additionally, system 1200 includes a communication device 1220, such as a transceiver, to wirelessly communicate with external systems.

Non-transitory computer-readable media may be any available media that can be accessed by processor(s) 1210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 1215 stores software modules that provide functionality when executed by processor(s) 1210. The modules include an operating system 1225 for system 1200. The modules further include an attitude control module 1230 that is configured to control the attitude and/or attitude rate of the vehicle using jet paddles and/or movable masses. For instance, attitude control module 1230 may be configured to perform any of the attitude and/or attitude rate control operations discussed herein. System 1200 may include one or more additional functional modules 1235 that include additional functionality.

One skilled in the art will appreciate that a "system" could be embodied as a computer, a server, a console, or any other suitable computing device, or combination of devices. However, in many embodiments, system 1200 will be implemented as electronics and software of an ACS, a reaction control system (RCS), and/or a flight control system (FCS) for a flying vehicle. Furthermore, in certain embodiments, separate systems may control attitude and flight path. Any suitable control system or combination of systems, whether electronic, mechanical, or both, may be used as a matter of design choice. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In some embodiments, attitude and/or attitude rate changes for a rocket-propelled vehicle may be provided using jet paddles. In other embodiments, changes in pitch/yaw, pitch/yaw rate, or both, may be provided using internal and/or external movable masses. In still other embodiments, a combination of jet paddles and movable masses may be used for attitude and/or attitude rate control. Such ACSs may be particularly well suited for small vehicles, but scale for, and can be used on, vehicles of any size.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a plurality of jet paddles located outside of a nozzle of the apparatus from which an exhaust flow exits the apparatus, the plurality of jet paddles configured to be moved into and/or sufficiently close to the exhaust flow, and configured to be moved away from the exhaust flow, to change a direction of thrust produced by the exhaust flow, wherein
each of the plurality of jet paddles rotates about an axis substantially orthogonal to an axis of symmetry of the nozzle, translates towards and away from the exhaust flow, or moves by a combination of rotation and translation towards and away from the exhaust flow,
the plurality of jet paddles are operably connected to a body of the apparatus, and
an edge of at least one of the plurality of jet paddles is connected to the body before an end of the nozzle from which the exhaust flow exits the nozzle and another edge of the at least one of the plurality of jet paddles extends beyond the end of the nozzle such that a portion of the at least one of the plurality of jet paddles is partially aft of the end of the nozzle.

2. The apparatus of claim 1, further comprising:
a linkage for each of the jet paddles configured to enable the respective jet paddle to move towards and away from the exhaust flow; and an actuator for each of the jet paddles operably connected to the respective linkage, jet paddle, or both, and configured to move the respective jet paddle towards and away from the exhaust flow.

3. The apparatus of claim 1, further comprising:
a computing system configured to monitor a flight of the apparatus, the computing system configured to:
monitor a flight of the apparatus for whether to change attitude and/or attitude rate due to a planned change in attitude, a planned change in attitude rate, and/or due to unknown force perturbations, and
when change is desired, perform thrust vector control by moving one or more of the jet paddles into or sufficiently close to the exhaust flow so as to affect the desired change.

4. The apparatus of claim 3, wherein the computing system is configured to change pitch by moving at least one jet paddle to generate pitch torque.

5. The apparatus of claim 3, wherein the computing system is configured to change yaw by moving at least one jet paddle to create a yaw force in a direction.

6. The apparatus of claim 3, wherein the computing system is configured to control roll by moving two pairs of jet paddles that are opposite one another with the exhaust flow between them, the two pairs of jet paddles positioned and moved to generate positive and negative roll torques.

7. The apparatus of claim 1, wherein at least two jet paddles are positioned on a same side of the apparatus.

8. A computer-implemented method, comprising:
monitoring, by a computing system, whether to execute thrust direction changes for a vehicle producing thrust with an exhaust flow due to a planned change thrust direction, and/or due to unknown and/or unplanned force perturbations; and
altering the thrust direction of the vehicle, by the computing system, when a thrust direction change is desired by moving at least one jet paddle into and/or sufficiently close to the exhaust flow, and/or moving at least one jet paddle away from the exhaust flow, wherein
the at least one jet paddle is moved by rotation about an axis substantially orthogonal to an axis of symmetry of the nozzle from which the exhaust flow exits the vehicle, moved by translation towards and away from the exhaust flow, or moved by a combination of rotation and translation towards and away from the exhaust flow,
the plurality of jet paddles are operably connected to a body of the vehicle,
the at least one jet paddle is located outside of a nozzle of the vehicle from which an exhaust flow exits the vehicle, and
an edge of at least one of the plurality of jet paddles is connected to the body before an end of the nozzle from which the exhaust flow exits the nozzle and another edge of the at least one of the plurality of jet paddles extends beyond the end of the nozzle such that a portion of the at least one of the plurality of jet paddles is partially aft of the end of the nozzle.

9. The computer-implemented method of claim 8, further comprising:
changing pitch, by the computing system, by moving at least one of the paddles into or sufficiently close to the exhaust flow to create a force in one direction along a single axis.

10. The computer-implemented method of claim 8, further comprising:
changing yaw, by the computing system, by moving at least one jet paddle into or sufficiently close to the exhaust flow to create a yaw force in a direction.

11. The computer-implemented method of claim 8, further comprising:
changing roll, by the computing system, by moving at least two jet paddles that are opposite each other, with the exhaust flow between them, to cause the vehicle to roll.

12. The computer-implemented method of claim 8, wherein two or more of pitch, yaw, and roll are changed simultaneously.

13. An apparatus, comprising:
a plurality of jet paddles configured to be moved into and/or sufficiently close to an exhaust flow, and configured to be moved away from the exhaust flow, to change a direction of thrust produced by the exhaust flow, wherein the plurality of jet paddles each rotate about an axis substantially orthogonal to an axis of symmetry of a nozzle from which the exhaust flow exits the apparatus, translate towards and away from the exhaust flow, or move by a combination of rotation and translation towards and away from the exhaust flow; and
one or more movable masses that sufficiently move a center-of-mass of the apparatus off a line of action of external forces acting on the apparatus, the external forces comprising a thrust force created by the exhaust flow, to at least in part facilitate flight control of the apparatus while the apparatus is in powered flight, wherein
the plurality of jet paddles are operably connected to a body of the apparatus.

14. The apparatus of claim 13, further comprising:
a computing system configured to perform attitude and/or attitude rate control for the apparatus by moving one or more of the jet paddles, at least one of the one or more moving masses, or both.

15. A computer-implemented method, comprising:
monitoring, by a computing system, whether to change attitude and/or attitude rate due to a planned correction, and/or due to unknown and/or unplanned force perturbations; and
altering the attitude and/or attitude rate of the vehicle, by the computing system, when a change is desired by moving at least one jet paddle sufficiently close to an exhaust flow such that the attitude and/or attitude rate of the vehicle is sufficiently altered to control flight, wherein
the at least one jet paddle is moved via rotation about an axis substantially orthogonal to an axis of symmetry of a nozzle from which the exhaust flow exits a vehicle, via translation towards and away from an exhaust flow, or via a combination of rotation and translation towards and away from the exhaust flow, and
an edge of the at least one jet paddle is connected to the body before an end of the nozzle from which the exhaust flow exits the nozzle and another edge of the at least one jet paddle extends beyond the end of the nozzle such that a portion of the at least one jet paddle is partially aft of the end of the nozzle.

16. The computer-implemented method of claim 15, wherein the altering of the attitude and/or attitude rate of the vehicle comprises altering a pitch of the vehicle, altering a yaw of the vehicle, altering a roll of the vehicle, or any combination thereof.

17. The apparatus of claim 1, wherein the apparatus comprises a rocket engine, and the exhaust flow is provided by the rocket engine.

18. The apparatus of claim 1, further comprising:
one or more movable masses that sufficiently move a center-of-mass of the apparatus to at least in part facilitate flight control of the apparatus while the apparatus is in powered flight.

19. The apparatus of claim 1, wherein
the exhaust flow is generated by a rocket engine, and
the jet paddles are capable of surviving operation in or near the exhaust flow for at least five seconds without erosion of the jet paddles adversely affecting flight control.

20. An apparatus, comprising:
a plurality of jet paddles located outside of a nozzle of the apparatus from which an exhaust flow from a motor or engine exits the apparatus, wherein
an edge of each of the plurality of jet paddles is operably connected to a body of the apparatus before an end of the nozzle from which the exhaust flow exits the nozzle such that the plurality of jet paddles rotate,
axes of rotation of the plurality of jet paddles are orthogonal to an axis of symmetry of the nozzle, and
another edge of each of the plurality of jet paddles extends beyond the end of the nozzle such that a portion of each of the plurality of jet paddles are each partially aft of the end of the nozzle.

21. The apparatus of claim 20, wherein the apparatus comprises a rocket engine, and the exhaust flow is provided by the rocket engine.

22. The apparatus of claim 20, wherein at least two of the plurality of jet paddles are positioned next to one another on a same side of the apparatus.

* * * * *